US012043399B2

(12) United States Patent  
Gansler et al.

(10) Patent No.: US 12,043,399 B2  
(45) Date of Patent: Jul. 23, 2024

(54) HYBRID PROPULSION SYSTEM FOR USE DURING UNCOMMANDED THRUST LOSS AND METHOD OF OPERATING

(71) Applicant: General Electric Company, Schenectady, NY (US)

(72) Inventors: Michael Thomas Gansler, Mason, OH (US); Robert Charles Hon, Fort Mitchell, KY (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 18/163,957

(22) Filed: Feb. 3, 2023

(65) Prior Publication Data

US 2023/0182919 A1    Jun. 15, 2023

Related U.S. Application Data

(62) Division of application No. 15/638,979, filed on Jun. 30, 2017, now abandoned.

(51) Int. Cl.
*B64D 31/10* (2006.01)
*B60L 50/16* (2019.01)
(Continued)

(52) U.S. Cl.
CPC .............. *B64D 31/10* (2013.01); *B60L 50/16* (2019.02); *B64D 27/24* (2013.01); *B64D 35/02* (2013.01);
(Continued)

(58) Field of Classification Search
CPC ........ B64D 31/10; B64D 27/24; B64D 27/02; B64D 27/10; B64D 27/16;
(Continued)

(56) References Cited

U.S. PATENT DOCUMENTS 3,611,282 A * 10/1971 Hill .................. F02C 7/262  
340/963  
3,791,141 A *  2/1974 Bush ................ F02K 7/10  
60/243

(Continued)

FOREIGN PATENT DOCUMENTS

CA       3051344 A1 *  3/2020
CN      105620765 A      6/2016

(Continued)

*Primary Examiner* — Richard A Goldman  
(74) *Attorney, Agent, or Firm* — Dority & Manning, P.A.

(57) ABSTRACT

A hybrid-electric propulsion system includes a propulsor, a turbomachine, and an electrical system having an electric machine coupled to the turbomachine. A method for operating the propulsion system includes operating, by one or more computing devices, the turbomachine to rotate the propulsor and generate thrust for the aircraft; receiving, by the one or more computing devices, data indicative of an un-commanded loss of the thrust generated from the turbomachine rotating the propulsor; and providing, by the one or more computing devices, electrical power to the electric machine to add power to the turbomachine, the propulsor, or both in response to receiving the data indicative of the un-commanded loss of thrust.

19 Claims, 7 Drawing Sheets

(51) Int. Cl.
    *B64D 27/24* (2006.01)
    *B64D 35/02* (2006.01)
    *F01D 15/10* (2006.01)
    *F01D 21/00* (2006.01)
    *F02K 5/00* (2006.01)
    *G05D 1/00* (2006.01)
    *B64D 27/02* (2006.01)

(52) U.S. Cl.
    CPC .............. *F01D 15/10* (2013.01); *F01D 21/00* (2013.01); *F02K 5/00* (2013.01); *G05D 1/0072* (2013.01); *B60L 2200/10* (2013.01); *B64D 27/026* (2024.01)

(58) Field of Classification Search
    CPC ... B64D 2027/026; B64D 35/02; B60L 50/16; B60L 2200/10; F01D 15/10; F01D 21/00; F02K 5/00; G05D 1/0072
    USPC .............................. 701/99, 60; 60/776, 243
    See application file for complete search history.

(56) References Cited

U.S. PATENT DOCUMENTS

| | | | |
|---|---|---|---|
| 4,280,060 A | 7/1981 | Kure-Jensen et al. | |
| 5,423,175 A | 6/1995 | Beebe et al. | |
| 5,565,118 A * | 10/1996 | Asquith | F23R 3/18 219/121.48 |
| 5,706,643 A * | 1/1998 | Snyder | F02C 9/28 60/776 |
| 5,768,886 A * | 6/1998 | Wang | F23R 3/22 60/749 |
| 5,987,889 A * | 11/1999 | Graves | F23R 3/14 60/746 |
| 6,018,233 A | 1/2000 | Glennon | |
| 6,178,927 B1 | 1/2001 | Rieck et al. | |
| 6,314,717 B1 | 11/2001 | Teets et al. | |
| 6,700,213 B1 | 3/2004 | Wakashiro et al. | |
| 6,712,165 B1 | 3/2004 | Okazaki | |
| 6,759,764 B1 | 7/2004 | Keller et al. | |
| 6,823,675 B2 | 11/2004 | Brunell et al. | |
| 8,030,875 B2 | 10/2011 | Regunath | |
| 8,099,944 B2 | 1/2012 | Foster et al. | |
| 8,127,548 B2 | 3/2012 | Anson et al. | |
| 8,141,360 B1 | 3/2012 | Huber | |
| 8,283,796 B2 | 10/2012 | Certain | |
| 8,489,246 B2 | 7/2013 | Dooley | |
| 8,552,575 B2 | 10/2013 | Teets et al. | |
| 8,572,996 B2 | 11/2013 | Dittmar et al. | |
| 8,757,542 B2 | 6/2014 | Hopdjanian et al. | |
| 8,857,191 B2 | 10/2014 | Hyde et al. | |
| 8,957,539 B1 | 2/2015 | Ralston | |
| 9,038,939 B2 | 5/2015 | Dyrla et al. | |
| 9,145,048 B2 | 9/2015 | King et al. | |
| 9,174,741 B2 | 11/2015 | Suntharalingam et al. | |
| 9,193,451 B2 | 11/2015 | Salyer | |
| 9,194,285 B2 | 11/2015 | Botti et al. | |
| 9,212,625 B2 | 12/2015 | Shelley | |
| 9,365,132 B2 | 6/2016 | Liu et al. | |
| 9,487,303 B2 | 11/2016 | Siegel et al. | |
| 9,493,245 B2 | 11/2016 | Salyer | |
| 9,581,025 B2 | 2/2017 | Eames | |
| 9,862,502 B2 | 1/2018 | Kim et al. | |
| 9,914,536 B2 | 3/2018 | Rossotto | |
| 10,040,566 B2 | 8/2018 | Waltner | |
| 2002/0123836 A1 | 9/2002 | Komiyama et al. | |
| 2005/0056024 A1* | 3/2005 | Lieuwen | F23M 11/045 60/779 |
| 2006/0137353 A1* | 6/2006 | Lieuwen | F23N 5/242 60/803 |
| 2007/0005219 A1 | 1/2007 | Muramatsu et al. | |
| 2007/0234730 A1* | 10/2007 | Markham | G01N 21/359 431/13 |
| 2008/0047275 A1* | 2/2008 | Ziminsky | F02C 9/26 60/776 |
| 2008/0134684 A1* | 6/2008 | Umeh | F02C 9/46 60/39.281 |
| 2008/0144237 A1* | 6/2008 | Hirasawa | H02P 29/032 361/25 |
| 2009/0145998 A1* | 6/2009 | Salyer | B64C 27/02 244/17.11 |
| 2010/0083632 A1* | 4/2010 | Foster | F01D 15/10 60/39.181 |
| 2010/0083669 A1* | 4/2010 | Foster | F02C 6/206 60/802 |
| 2010/0125383 A1* | 5/2010 | Caouette | B63J 3/00 701/21 |
| 2010/0126178 A1* | 5/2010 | Hyde | B64D 27/24 60/645 |
| 2010/0230547 A1* | 9/2010 | Tayman | B64C 27/24 244/7 C |
| 2011/0108663 A1 | 5/2011 | Westenberger | |
| 2011/0138765 A1* | 6/2011 | Lugg | H05H 1/50 310/90.5 |
| 2011/0155397 A1 | 6/2011 | Icove et al. | |
| 2012/0088197 A1* | 4/2012 | Byrd | F23N 5/16 431/2 |
| 2012/0131925 A1* | 5/2012 | Mittricker | F23R 3/06 60/39.23 |
| 2013/0147192 A1* | 6/2013 | Condon | F02C 7/268 290/34 |
| 2013/0154410 A1 | 6/2013 | Morita et al. | |
| 2014/0030092 A1 | 1/2014 | Heinig et al. | |
| 2014/0367510 A1* | 12/2014 | Viala | B64D 27/24 244/62 |
| 2015/0013306 A1* | 1/2015 | Shelley | F02K 5/00 60/224 |
| 2015/0015103 A1 | 1/2015 | Isoda et al. | |
| 2015/0151844 A1 | 6/2015 | Anton et al. | |
| 2015/0198097 A1* | 7/2015 | Aphale | F02C 9/00 700/287 |
| 2015/0274306 A1 | 10/2015 | Sheridan | |
| 2015/0315965 A1* | 11/2015 | Moine | B64C 27/14 60/39.54 |
| 2015/0367950 A1* | 12/2015 | Rajashekara | B64D 27/10 903/930 |
| 2016/0023773 A1* | 1/2016 | Himmelmann | B64D 27/24 903/903 |
| 2016/0122034 A1* | 5/2016 | Bortoli | F01D 25/02 416/142 |
| 2016/0236790 A1 | 8/2016 | Knapp et al. | |
| 2016/0273767 A1* | 9/2016 | Unni | F02C 9/28 |
| 2016/0304211 A1 | 10/2016 | Swann | |
| 2016/0325629 A1 | 11/2016 | Siegel et al. | |
| 2016/0340051 A1 | 11/2016 | Edwards et al. | |
| 2016/0356280 A1 | 12/2016 | Pascu et al. | |
| 2017/0045004 A1 | 2/2017 | Naidu et al. | |
| 2017/0051683 A1* | 2/2017 | Murugesan | F23N 5/203 |
| 2017/0107914 A1* | 4/2017 | Lu | F02K 3/04 |
| 2017/0291712 A1* | 10/2017 | Himmelmann | F01D 15/10 |
| 2018/0002025 A1 | 1/2018 | Lents et al. | |
| 2018/0003072 A1* | 1/2018 | Lents | F02C 7/36 |
| 2018/0010528 A1* | 1/2018 | Bolaños-Chaverri | F02C 9/28 |
| 2018/0080430 A1* | 3/2018 | Mei | F04D 29/624 |
| 2018/0127103 A1* | 5/2018 | Cantemir | F02C 7/32 |
| 2018/0266270 A1* | 9/2018 | Asti | F02C 7/262 |
| 2018/0283285 A1* | 10/2018 | Cheung | F02C 7/228 |
| 2018/0328817 A1* | 11/2018 | Andrews | G01M 15/14 |
| 2018/0354635 A1* | 12/2018 | Wagner | F02K 5/00 |
| 2018/0357840 A1* | 12/2018 | Gansler | G07C 5/0808 |
| 2018/0370646 A1 | 12/2018 | Hon et al. | |
| 2018/0372003 A1* | 12/2018 | Hon | F01D 25/36 |
| 2019/0001955 A1* | 1/2019 | Gansler | B64D 27/24 |
| 2019/0002113 A1* | 1/2019 | Gansler | F01D 15/10 |
| 2019/0002115 A1* | 1/2019 | Miller | B64D 27/24 |
| 2019/0002116 A1* | 1/2019 | Gansler | F02K 5/00 |
| 2019/0002117 A1* | 1/2019 | Gansler | F01D 15/10 |
| 2019/0128780 A1* | 5/2019 | Pilon | G05B 23/0235 |
| 2019/0264701 A1* | 8/2019 | Rowe | F04D 27/02 |

(56) References Cited

U.S. PATENT DOCUMENTS

| | | | |
|---|---|---|---|
| 2020/0092052 A1* | 3/2020 | MacAfee | .................. H04L 1/08 |
| 2022/0063819 A1 | 3/2022 | Murrow et al. | |
| 2023/0182919 A1* | 6/2023 | Gansler | .................. B64D 31/10 |
| | | | 701/99 |

FOREIGN PATENT DOCUMENTS

| | | | | |
|---|---|---|---|---|
| CN | 105752344 A | 7/2016 | | |
| CN | 108082500 A | 5/2018 | | |
| CN | 207433818 U | 6/2018 | | |
| DE | 102013209538 A1 | 11/2014 | | |
| DE | 102014224637 A1 | 6/2016 | | |
| EP | 2962885 A1 | 1/2016 | | |
| FR | 2946020 A1 * | 12/2010 | ............. | G01D 7/002 |
| FR | 2964086 A1 * | 3/2012 | ............. | B64D 13/06 |
| FR | 3128492 A1 * | 4/2023 | | |
| WO | WO-2014096694 A1 * | 6/2014 | ............. | B64C 27/14 |
| WO | WO2015/075538 A1 | 5/2015 | | |
| WO | WO-2018175349 A1 * | 9/2018 | ......... | B64C 29/0008 |
| WO | WO-2018178565 A1 * | 10/2018 | ............. | B64C 27/06 |

\* cited by examiner

HYBRID PROPULSION SYSTEM FOR USE DURING UNCOMMANDED THRUST LOSS AND METHOD OF OPERATING

CROSS-REFERENCE TO RELATED APPLICATIONS

This application is a Divisional Application of U.S. application Ser. No. 15/638,979, filed Jun. 30, 2017, which is hereby incorporated by reference in its entirety.

FIELD

The present subject matter relates generally to a hybrid-electric propulsion system, and a method for operating the hybrid electric propulsion system during an un-commanded loss of thrust.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is typically mounted to a respective one of the wings of the aircraft, such as in a suspended position beneath the wing, separated from the wing and fuselage.

During flight operations of the aircraft, it is possible that one or both of the aircraft engines may experience an un-commanded loss of thrust. The un-commanded loss of thrust may be a total loss of thrust, or a reduction in thrust, in response to, e.g., an ingestion event (such as a bird strike, or ice ingestion) or a combustor blowout. The un-commanded loss of thrust may limit a flight crew's ability to control the aircraft and perform certain functions. Accordingly, a propulsion system for an aircraft capable of compensating for such an un-commanded loss of thrust would be useful.

BRIEF DESCRIPTION

Aspects and advantages of the invention will be set forth in part in the following description, or may be obvious from the description, or may be learned through practice of the invention.

In an exemplary aspect of the present disclosure, a method for operating a turbomachine of a hybrid-electric propulsion system of an aircraft is provided. The hybrid-electric propulsion system includes a propulsor, a turbomachine, and an electrical system having an electric machine coupled to the turbomachine. The method includes operating, by one or more computing devices, the turbomachine to rotate the propulsor and generate thrust for the aircraft; receiving, by the one or more computing devices, data indicative of an un-commanded loss of the thrust generated from the turbomachine rotating the propulsor; and providing, by the one or more computing devices, electrical power to the electric machine to add power to the turbomachine, the propulsor, or both in response to receiving the data indicative of the un-commanded loss of thrust.

In certain exemplary aspects the electrical system further includes an electric energy storage unit, and providing, by the one or more computing devices, electrical power to the electric machine includes providing, by the one or more computing devices, electrical power to the electric machine from the electric energy storage unit.

In certain exemplary aspects the turbomachine is a first turbomachine, wherein the electric machine is a first electric machine, wherein the hybrid electric propulsion system further includes a second turbomachine, wherein the electrical system further includes a second electric machine coupled to the second turbomachine, and wherein providing, by the one or more computing devices, electrical power to the electric machine includes providing, by the one or more computing devices, electrical power to the first electric machine from the second electric machine.

In certain exemplary aspects receiving, by the one or more computing devices, data indicative of the un-commanded loss of the thrust includes receiving, by the one or more computing devices, data indicative of a reduction in a rotational speed of the turbomachine.

In certain exemplary aspects receiving, by the one or more computing devices, data indicative of the un-commanded loss of the thrust includes receiving, by the one or more computing devices, data indicative of an increased vibration of one or more components of the turbomachine, of the propulsor, or both.

In certain exemplary aspects receiving, by the one or more computing devices, data indicative of the un-commanded loss of the thrust includes receiving, by one or more computing devices, data indicative of a reduced pressure within the turbomachine. For example, in certain exemplary aspects the data indicative of the reduced pressure within the turbomachine is indicative of a combustor blowout.

In certain exemplary aspects, the method further includes terminating, by the one or more computing devices, the provision of electrical power to the electric machine to add power to the turbomachine, the propulsor, or both. For example, in certain exemplary aspects, the method further includes receiving, by the one or more computing devices, data indicative of a restoration of engine operability, wherein terminating, by the one or more computing devices, the provision of electrical power to the electric machine includes terminating, by the one or more computing devices, the provision of electrical power to the electric machine in response to receiving, by the one or more computing devices, data indicative of the restoration of engine operability.

For example, in certain exemplary aspects receiving, by the one or more computing devices, data indicative of the restoration of engine operability includes receiving, by the one or more computing devices, data indicative of a restoration of the thrust generated from the turbomachine rotating the propulsor, and wherein the data indicative of the restoration of the thrust includes data indicative of an operability parameter of the turbomachine being within a certain operability range.

For example, in certain exemplary aspects receiving, by the one or more computing devices, data indicative of the restoration of engine operability includes receiving, by the one or more computing devices, data indicative of a restoration of the thrust generated from the turbomachine rotating the propulsor, and wherein the data indicative of the restoration of the thrust includes data indicative of at least one of a rotational speed of the turbomachine being above a determined threshold or a pressure within the turbomachine being above a determined threshold.

Additionally, or alternatively, in certain exemplary aspects, the method further includes receiving, by the one or more computing devices, data indicative of a charge level of the electric energy storage unit, and wherein terminating, by the one or more computing devices, the provision of electrical power to the electric machine includes terminating, by the one or more computing devices, the provision of electrical power to the electric machine in response to receiving, by the one or more computing devices, data indicative of the charge level of the electric energy storage unit.

Additionally, or alternatively, in certain exemplary aspects, the method further includes receiving, by the one or more computing devices, data indicative of a health of the electric energy storage unit, and wherein terminating, by the one or more computing devices, the provision of electrical power to the electric machine includes terminating, by the one or more computing devices, the provision of electrical power to the electric machine in response to receiving, by the one or more computing devices, data indicative of the health of the electric energy storage unit.

Additionally, or alternatively, in certain exemplary aspects, the method further includes receiving, by the one or more computing devices, data indicative of a temperature of the electric machine, and wherein terminating, by the one or more computing devices, the provision of electrical power to the electric machine includes terminating, by the one or more computing devices, the provision of electrical power to the electric machine in response to receiving, by the one or more computing devices, data indicative of the temperature of the electric machine.

In certain exemplary aspects providing, by the one or more computing devices, electrical power to the electric machine includes transferring, by one or more computing devices, at least about ten amps of electrical power to the electric machine.

In certain exemplary aspects providing, by the one or more computing devices, electrical power to the electric machine includes providing, by the one or more computing devices, electrical power to the electric machine such that the electric machine provides at least about fifteen horsepower of mechanical power to the turbomachine.

In certain exemplary aspects operating, by the one or more computing devices, the turbomachine to rotate the propulsor and generate thrust for the aircraft includes extracting, by the one or more computing devices electrical power from the electric machine.

In an exemplary embodiment of the present disclosure, a hybrid-electric propulsion system for an aircraft is provided. The hybrid electric propulsion system includes a propulsor, a turbomachine coupled to the propulsor for driving the propulsor and generating thrust, and an electrical system including an electric machine, the electric machine coupled to the turbomachine. The hybrid electric propulsion system further includes a controller configured to receive data indicative of an un-commanded loss of thrust generated from the turbomachine driving the propulsor, and further to provide electrical power to the electric machine to add power to the turbomachine, the propulsor, or both in response to receiving the data indicative of the un-commanded loss of the thrust.

In certain exemplary embodiments the electrical system further includes an electric energy storage unit, and wherein in providing electrical power to the electric machine, the controller is configured to provide electrical power to the electric machine from the electric energy storage unit.

In certain exemplary embodiments the electric machine is configured to provide at least about sixty-five horsepower of mechanical power to the turbomachine, the propulsor, or both when electrical power is provided thereto.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
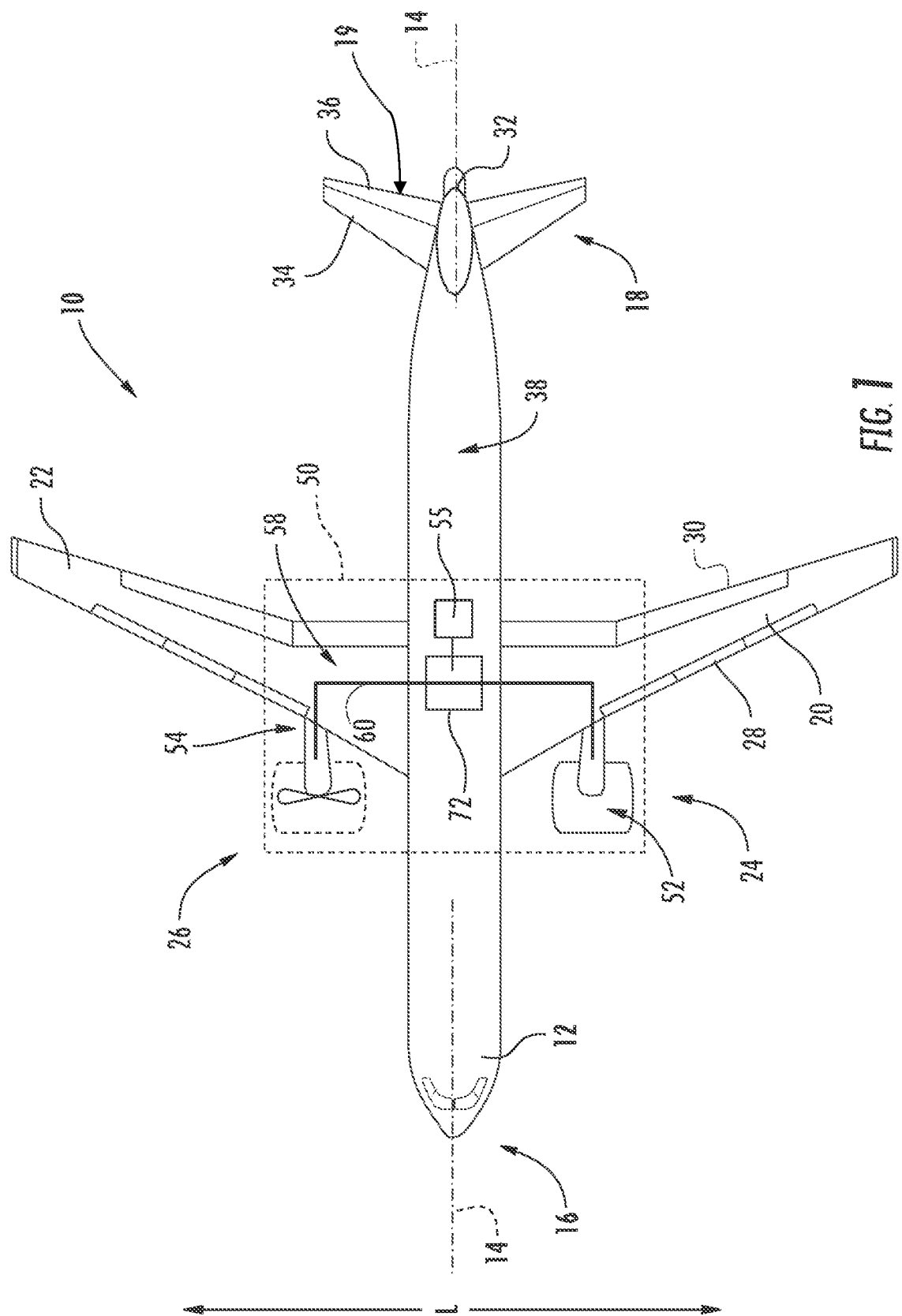
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to a hybrid electric propulsion system having a first turbomachine coupled to a first propulsor and an electrical system including a first electric machine and an electric energy storage unit electrically connectable to the first electric machine. The first electric machine is coupled to the first turbomachine, the first propulsor, or both and accordingly may be driven by the first turbomachine and/or may drive the first turbomachine and/or the first propulsor in certain operations. Moreover, in other exemplary embodiments, the hybrid electric propulsion system may further include a second propulsor, and the electrical system may further include a second electric machine coupled to the second propulsor and electrically connectable to electric energy storage unit, the first electric machine, or both.

For example, in certain exemplary embodiments, the first turbomachine and first propulsor may together be configured as part of a turbofan engine and the second propulsor may be configured as part of an electric propulsor assembly (e.g., an electric fan). Alternatively, in other exemplary embodiments, the first turbomachine and first propulsor may together be configured as part of a first turbofan engine and the second propulsor may be configured as part of a second turbofan engine (e.g., with the hybrid electric propulsion system further including a second turbomachine). Further, in other exemplary embodiments these components may be configured as part of, e.g., turboprop engine(s), or any other suitable gas turbine engine(s).

In certain operations, the hybrid electric propulsion system may be operated to compensate for an un-commanded loss of thrust generated by the first turbomachine rotating the first propulsor. For example, the method may operate the first turbomachine to rotate the first propulsor to generate the thrust for the aircraft, and further may receive data indicative of an un-commanded loss of the thrust generated from the first turbomachine rotating the first propulsor. For example, the received data may include data indicative of a reduction in a rotational speed of the first turbomachine, a reduction of a pressure within the first turbomachine, an increase in an amount of vibration of one or more components within the first turbomachine, etc.

Further, in response to receiving the data indicative of the un-commanded loss of the thrust, the method may provide electrical power to the first electric machine to add power to the first turbomachine, the first propulsor, or both. For example, in certain exemplary aspects, the method may provide electrical power to the first electric machine from the electric energy storage unit to add power to the first turbomachine, the first propulsor, or both. Such provision of electrical power to the first electric machine to add power may supplement the loss of the thrust, such that the aircraft may continue to perform in the immediate timeframe.

Moreover, in certain exemplary aspects, the method may terminate the provision of electrical power to the first electric machine under certain situations. For example, the method may terminate the provision of electrical power to the first electric machine once the thrust is restored, once an electrical charge of the electric energy storage unit falls below a normal threshold, once a temperature of the first electric machine exceeds a certain threshold, etc.

Referring now to the drawings, wherein identical numerals indicate the same elements throughout the figures, FIG. 1 provides a top view of an exemplary aircraft 10 as may incorporate various embodiments of the present disclosure. As shown in FIG. 1, the aircraft 10 defines a longitudinal centerline 14 that extends therethrough, a lateral direction L, a forward end 16, and an aft end 18. Moreover, the aircraft 10 includes a fuselage 12, extending longitudinally from the forward end 16 of the aircraft 10 to the aft end 18 of the aircraft 10, and an empennage 19 at the aft end of the aircraft 10. Additionally, the aircraft 10 includes a wing assembly including a first, port side wing 20 and a second, starboard side wing 22. The first and second wings 20, 22 each extend laterally outward with respect to the longitudinal centerline 14. The first wing 20 and a portion of the fuselage 12 together define a first side 24 of the aircraft 10, and the second wing 22 and another portion of the fuselage 12 together define a second side 26 of the aircraft 10. For the embodiment depicted, the first side 24 of the aircraft 10 is configured as the port side of the aircraft 10, and the second side 26 of the aircraft 10 is configured as the starboard side of the aircraft 10.

Each of the wings 20, 22 for the exemplary embodiment depicted includes one or more leading edge flaps 28 and one or more trailing edge flaps 30. The aircraft 10 further includes, or rather, the empennage 19 of the aircraft 10 includes, a vertical stabilizer 32 having a rudder flap (not shown) for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration. For example, in other embodiments, the aircraft 10 may include any other configuration of stabilizer.

Figure 2:
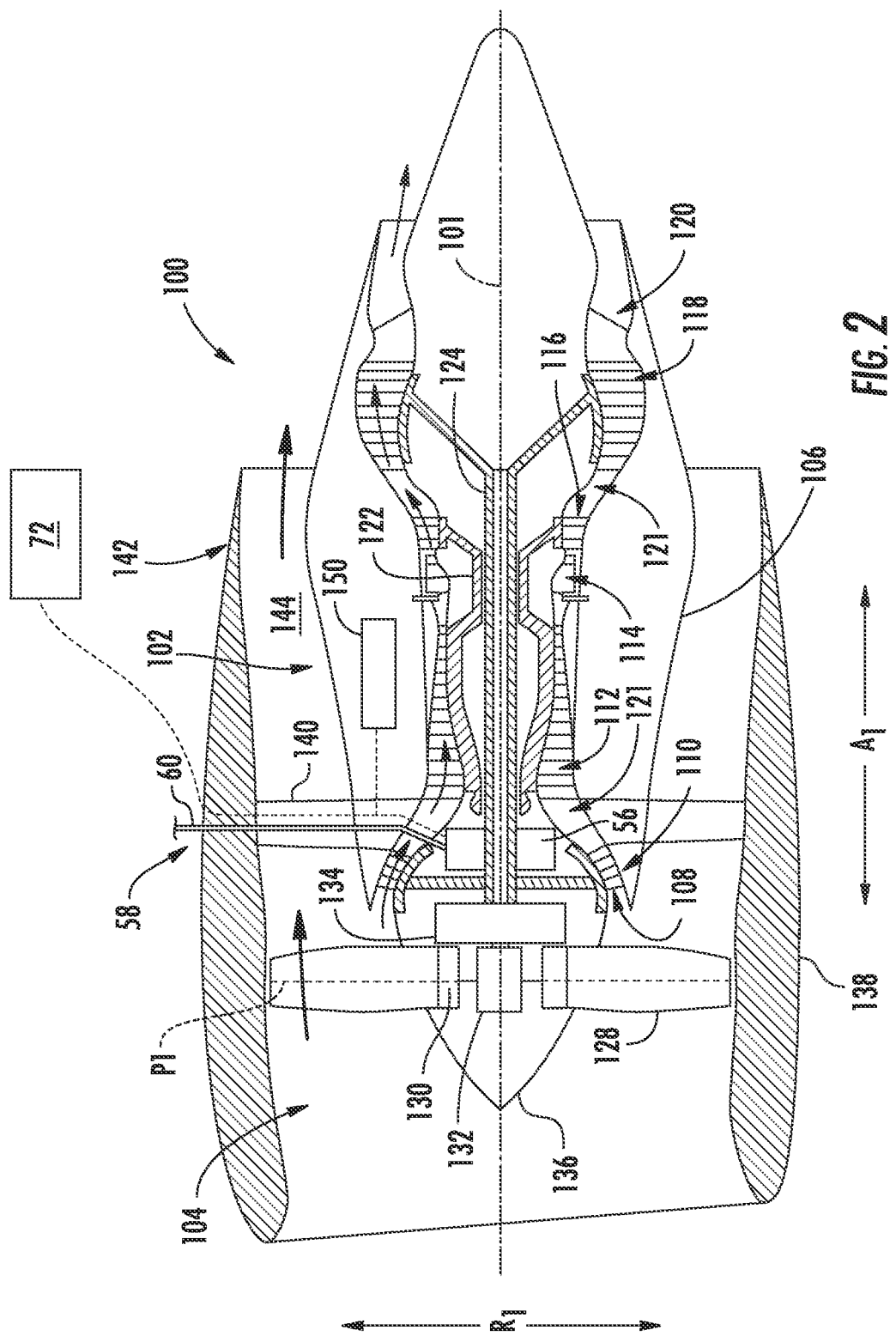
FIG. 2 is a schematic, cross-sectional view of a gas turbine engine mounted to the exemplary aircraft of FIG. 1.
Figure 3:
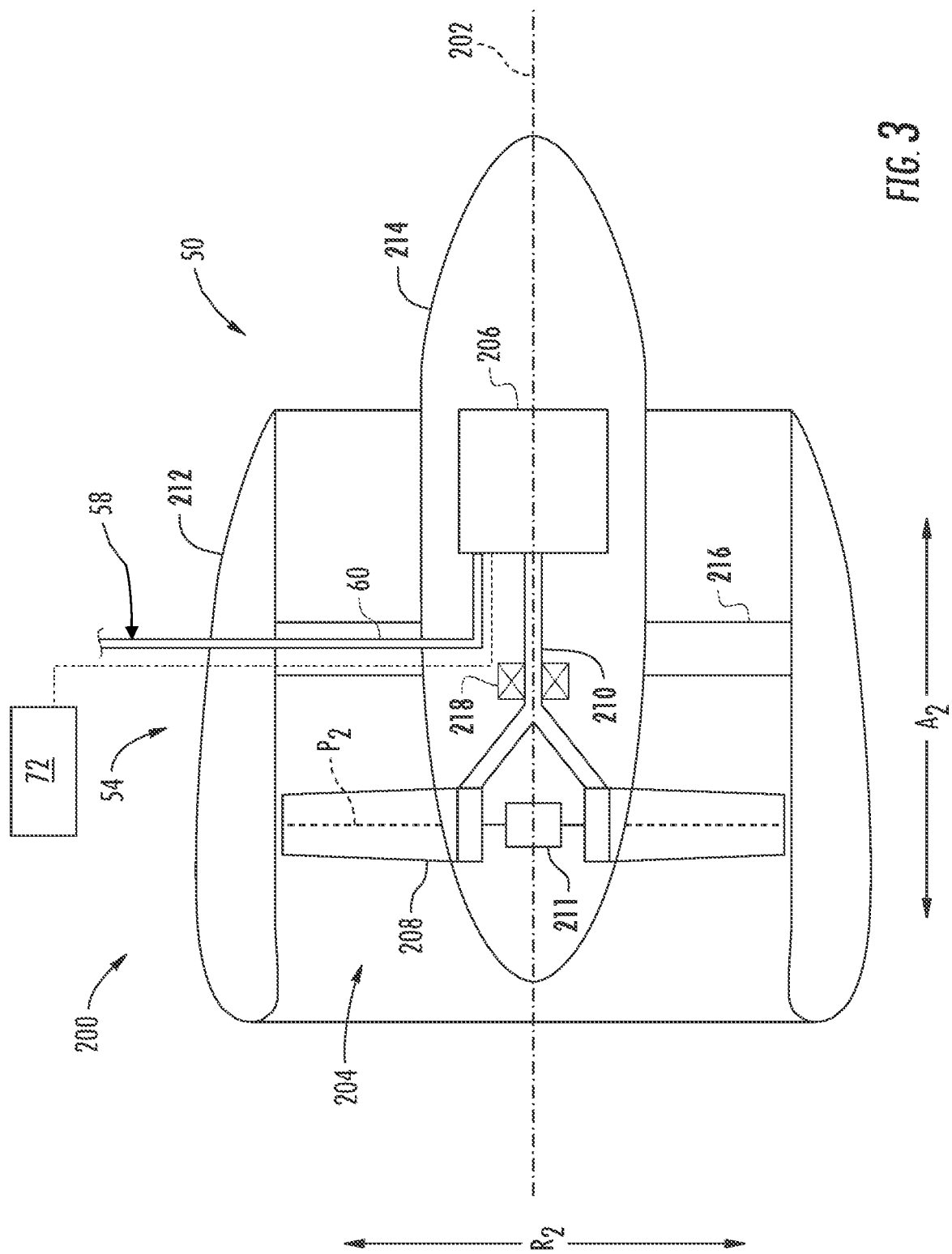
FIG. 3 is a schematic, cross-sectional view of an electric fan assembly in accordance with an exemplary embodiment of the present disclosure.

Referring now also to FIGS. 2 and 3, the exemplary aircraft 10 of FIG. 1 additionally includes a hybrid-electric propulsion system 50 having a first propulsor assembly 52 and a second propulsor assembly 54 (see FIG. 1). FIG. 2 provides a schematic, cross-sectional view of the first propulsor assembly 52 (labeled gas turbine engine 100, discussed below), and FIG. 3 provides a schematic, cross-sectional view of the second propulsor assembly 54 (labeled electric propulsor assembly 200, discussed below). For the embodiment depicted, the first propulsor assembly 52 and second propulsor assembly 54 are each configured in an underwing-mounted configuration. However, as will be discussed below, one or both of the first and second propulsor assemblies 52, 54 may in other exemplary embodiments be mounted at any other suitable location.

More particularly, referring generally to FIGS. 1 through 3, the exemplary hybrid-electric propulsion system 50 generally includes the first propulsor assembly 52 having a turbomachine and a prime propulsor (which, for the embodiment of FIG. 2 are configured together as a gas turbine engine, or rather as a turbofan engine 100), an electric machine 56 (which for the embodiment depicted in FIG. 2 is an electric motor/generator) drivingly coupled to the turbomachine, the second propulsor assembly 54 (which for the embodiment of FIG. 3 is configured as an electric propulsor assembly 200), an electric energy storage unit 55 (electrically connectable to the electric machine 56 and/or the electric propulsor assembly 200), a controller 72, and a power bus 58. The electric propulsor assembly 200, the electric energy storage unit 55, and the electric machine 56 are each electrically connectable to one another through one or more electric lines 60 of the power bus 58. For example, the power bus 58 may include various switches or other power electronics movable to selectively electrically connect the various components of the hybrid electric propulsion system 50. Additionally, the power bus 58 may further include power electronics, such as inverters, converters, rectifiers, etc., for conditioning or converting electrical power within the hybrid electric propulsion system 50.

As will be appreciated, the controller 72 may be configured to distribute electrical power between the various components of the hybrid-electric propulsion system 50. For example, the controller 72 may be operable with the power bus 58 (including the one or more switches or other power electronics) to provide electrical power to, or draw electrical power from, the various components, such as the electric machine 56, to operate the hybrid electric propulsion system 50 between various operating modes and perform various functions. Such is depicted schematically as the electric lines 60 of the power bus 58 extending through the controller 72, and will be discussed in greater detail below.

The controller 72 may be a stand-alone controller, dedicated to the hybrid-electric propulsion system 50, or alternatively, may be incorporated into one or more of a main system controller for the aircraft 10, a separate controller for the exemplary turbofan engine 100 (such as a full authority digital engine control system for the turbofan engine 100, also referred to as a FADEC), etc. For example, the controller 72 may be configured in substantially the same manner as the exemplary computing system 500 described below with reference to FIG. 7 (and may be configured to perform one or more of the functions of the exemplary method 300, described below).

Additionally, the electric energy storage unit 55 may be configured as one or more batteries, such as one or more lithium-ion batteries, or alternatively may be configured as any other suitable electrical energy storage devices. It will be appreciated that for the hybrid-electric propulsion system 50 described herein, the electric energy storage unit 55 is configured to store a relatively large amount of electrical power. For example, in certain exemplary embodiments, the electric energy storage unit may be configured to store at least about fifty kilowatt hours of electrical power, such as at least about sixty-five kilowatt hours of electrical power, such as at least about seventy-five kilowatts hours of electrical power, and up to about one thousand kilowatt hours of electrical power.

Referring now particularly to FIGS. 1 and 2, the first propulsor assembly 52 includes a gas turbine engine mounted, or configured to be mounted, to the first wing 20 of the aircraft 10. More specifically, for the embodiment of FIG. 2, the gas turbine engine includes a turbomachine 102 and a propulsor, the propulsor being a fan (referred to as "fan 104" with reference to FIG. 2). Accordingly, for the embodiment of FIG. 2, the gas turbine engine is configured as a turbofan engine 100.

The turbofan engine 100 defines an axial direction A1 (extending parallel to a longitudinal centerline 101 provided for reference) and a radial direction R1. As stated, the turbofan engine 100 includes the fan 104 and the turbomachine 102 disposed downstream from the fan 104.

The exemplary turbomachine 102 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a first, high pressure (HP) turbine 116 and a second, low pressure (LP) turbine 118; and a jet exhaust nozzle section 120. The compressor section, combustion section 114, and turbine section together define at least in part a core air flowpath 121 through the turbomachine 102.

The exemplary turbomachine 102 of the turbofan engine 100 additionally includes one or more shafts rotatable with at least a portion of the turbine section and, for the embodiment depicted, at least a portion of the compressor section. More particularly, for the embodiment depicted, the turbofan engine 100 includes a high pressure (HP) shaft or spool 122, which drivingly connects the HP turbine 116 to the HP compressor 112. Additionally, the exemplary turbofan engine 100 includes a low pressure (LP) shaft or spool 124, which drivingly connects the LP turbine 118 to the LP compressor 110.

Further, the exemplary fan 104 depicted is configured as a variable pitch fan having a plurality of fan blades 128 coupled to a disk 130 in a spaced apart manner. The fan blades 128 extend outwardly from disk 130 generally along the radial direction R1. Each fan blade 128 is rotatable relative to the disk 130 about a respective pitch axis P1 by virtue of the fan blades 128 being operatively coupled to a suitable actuation member 132 configured to collectively vary the pitch of the fan blades 128. The fan 104 is mechanically coupled to the LP shaft 124, such that the fan 104 is mechanically driven by the second, LP turbine 118. More particularly, the fan 104, including the fan blades 128, disk 130, and actuation member 132, is mechanically coupled to the LP shaft 124 through a power gearbox 134, and is rotatable about the longitudinal axis 101 by the LP shaft 124 across the power gear box 134. The power gear box 134 includes a plurality of gears for stepping down the rotational speed of the LP shaft 124 to a more efficient rotational fan speed. Accordingly, the fan 104 is powered by an LP system (including the LP turbine 118) of the turbomachine 102.

Referring still to the exemplary embodiment of FIG. 2, the disk 130 is covered by rotatable front hub 136 aerodynamically contoured to promote an airflow through the plurality of fan blades 128. Additionally, the turbofan engine 100 includes an annular fan casing or outer nacelle 138 that circumferentially surrounds the fan 104 and/or at least a portion of the turbomachine 102. Accordingly, the exemplary turbofan engine 100 depicted may be referred to as a "ducted" turbofan engine. Moreover, the nacelle 138 is supported relative to the turbomachine 102 by a plurality of circumferentially-spaced outlet guide vanes 140. A downstream section 142 of the nacelle 138 extends over an outer portion of the turbomachine 102 so as to define a bypass airflow passage 144 therebetween.

Referring still to FIG. 2, the hybrid-electric propulsion system 50 additionally includes an electric machine 56, which for the embodiment depicted is configured as an electric motor/generator. The electric machine 56 is, for the embodiment depicted, positioned within the turbomachine 102 of the turbofan engine 100, inward of the core air flowpath 121, and is coupled to/in mechanical communication with one of the shafts of the turbofan engine 100. More specifically, for the embodiment depicted, the electric machine is coupled to the second, LP turbine 118 through the LP shaft 124. The electric machine 56 may be configured to convert mechanical power of the LP shaft 124 to electrical power (such that the LP shaft 124 drives the electric machine 56), or alternatively the electric machine 56 may be configured to convert electrical power provided thereto into mechanical power for the LP shaft 124 (such that the electric machine 56 drives, or assists with driving, the LP shaft 124).

It should be appreciated, however, that in other exemplary embodiments, the electric machine 56 may instead be positioned at any other suitable location within the turbomachine 102 or elsewhere. For example, the electric machine 56 may be, in other embodiments, mounted coaxially with the LP shaft 124 within the turbine section, or alternatively may be offset from the LP shaft 124 and driven through a suitable gear train. Additionally, or alternatively, in other exemplary embodiments, the electric machine 56 may instead be powered by the HP system, i.e., by the HP turbine 116 through, e.g., the HP shaft 122, or by both the LP system (e.g., the LP shaft 124) and the HP system (e.g., the HP shaft 122) via a dual drive system. Additionally, or alternatively, still, in other embodiments, the electric machine 56 may include a plurality of electric machines, e.g., with one being drivingly connected to the LP system (e.g., the LP shaft 124) and one being drivingly connected to the HP system (e.g., the HP shaft 122). Further, although the electric machine 56 is described as an electric motor/generator, in other exemplary embodiments, the electric machine 56 may be configured solely as an electric generator.

Notably, in certain exemplary embodiments, the electric machine 56 may be configured to generate at least about fifty kilowatts of electrical power when driven by the turbomachine 102, such as at least about sixty-five kilowatts of electrical power, such as at least about seventy-five kilowatts of electrical power, such as at least about one hundred kilowatts of electrical power, such as up to one thousand kilowatts of electrical power. Additionally, or alternatively, the electric machine 56 may be configured to provide, or otherwise add, at least about fifteen horsepower of mechanical power to the turbomachine 102 when the electric machine 56 is provided electrical power from, e.g., the electric energy storage unit 55. For example, in certain exemplary embodiments, the electric machine 56 may be configured to provide at least about sixty-five horsepower of mechanical power to the turbomachine 102, such as at least about seventy-five horsepower of mechanical power to the turbomachine 102, such as at least about one hundred horsepower, such as at least about one hundred and twenty horsepower, such as up to about one thousand three hundred horsepower.

Referring still to FIGS. 1 and 2, the turbofan engine 100 further includes a controller 150 and a plurality of sensors (not shown). The controller 150 may be a full authority digital engine control system, also referred to as a FADEC. The controller 150 of the turbofan engine 100 may be configured to control operation of, e.g., the actuation member 132, the fuel delivery system, etc. Additionally, referring back also to FIG. 1, the controller 150 of the turbofan engine 100 is operably connected to the controller 72 of the hybrid-electric propulsion system 50. Moreover, as will be appreciated, the controller 72 may further be operably connected to one or more of the first propulsor assembly 52 (including controller 150), the electric machine 56, the second propulsor assembly 54, and the energy storage unit 55 through a suitable wired or wireless communication system (depicted in phantom).

Moreover, although not depicted, in certain exemplary embodiments, the turbofan engine 100 may further include one or more sensors positioned to, and configured to, sense data indicative of one or more operational parameters of the turbofan engine 100. For example, the turbofan engine 100 may include one or more temperature sensors configured to sense a temperature within a core air flowpath 121 of the turbomachine 102. For example, such sensors may be configured to sense an exhaust gas temperature at an exit of the combustion section 114. Additionally, or alternatively, the turbofan engine 100 may include one or more pressure sensors to sense data indicative of a pressure within the core air flowpath 121 of the turbomachine 102, such as within a combustor within the combustion section 114 of the turbomachine 102. Further, in still other exemplary embodiments, the turbofan engine 100 may also include one or more speed sensors configured to sense data indicative of a rotational speed of one or more components of the turbofan engine 100, such as one or more of the LP spool 124 or the HP spool 122. Additionally, in certain exemplary embodiments, the turbofan engine 100 may include one or more sensors configured to sense data indicative of an amount of vibration of various components within the turbofan engine, such as an amount of vibration of the LP compressor 110, the HP compressor 112, or various support structures.

It should further be appreciated that the exemplary turbofan engine 100 depicted in FIG. 2 may, in other exemplary embodiments, have any other suitable configuration. For example, in other exemplary embodiments, the fan 104 may not be a variable pitch fan, and further, in other exemplary embodiments, the LP shaft 124 may be directly mechanically coupled to the fan 104 (i.e., the turbofan engine 100 may not include the gearbox 134). Further, it should be appreciated that in other exemplary embodiments, the turbofan engine 100 may be configured as any other suitable gas turbine engine. For example, in other embodiments, the turbofan engine 100 may instead be configured as a turboprop engine, an unducted turbofan engine, a turbojet engine, a turboshaft engine, etc.

Referring now particularly to FIGS. 1 and 3, as previously stated the exemplary hybrid-electric propulsion system 50 additionally includes the second propulsor assembly 54 mounted, for the embodiment depicted, to the second wing 22 of the aircraft 10. Referring particularly to FIG. 3, the second propulsor assembly 54 is generally configured as an electric propulsor assembly 200 including an electric motor 206 and a propulsor/fan 204. The electric propulsor assembly 200 defines an axial direction A2 extending along a longitudinal centerline axis 202 that extends therethrough for reference, as well as a radial direction R2. For the embodiment depicted, the fan 204 is rotatable about the centerline axis 202 by the electric motor 206.

The fan 204 includes a plurality of fan blades 208 and a fan shaft 210. The plurality of fan blades 208 are attached to/rotatable with the fan shaft 210 and spaced generally along a circumferential direction of the electric propulsor assembly 200 (not shown). In certain exemplary embodiments, the plurality of fan blades 208 may be attached in a fixed manner to the fan shaft 210, or alternatively, the plurality of fan blades 208 may be rotatable relative to the fan shaft 210, such as in the embodiment depicted. For example, the plurality of fan blades 208 each define a respective pitch axis P2, and for the embodiment depicted are attached to the fan shaft 210 such that a pitch of each of the plurality of fan blades 208 may be changed, e.g., in unison, by a pitch change mechanism 211. Changing the pitch of the plurality of fan blades 208 may increase an efficiency of the second propulsor assembly 54 and/or may allow the second propulsor assembly 54 to achieve a desired thrust profile. With such an exemplary embodiment, the fan 204 may be referred to as a variable pitch fan.

Moreover, for the embodiment depicted, the electric propulsor assembly 200 depicted additionally includes a fan casing or outer nacelle 212, attached to a core 214 of the electric propulsor assembly 200 through one or more struts or outlet guide vanes 216. For the embodiment depicted, the outer nacelle 212 substantially completely surrounds the fan 204, and particularly the plurality of fan blades 208. Accordingly, for the embodiment depicted, the electric propulsor assembly 200 may be referred to as a ducted electric fan.

Referring still particularly to FIG. 3, the fan shaft 210 is mechanically coupled to the electric motor 206 within the core 214, such that the electric motor 206 drives the fan 204 through the fan shaft 210. The fan shaft 210 is supported by one or more bearings 218, such as one or more roller bearings, ball bearings, or any other suitable bearings. Additionally, the electric motor 206 may be an inrunner electric motor (i.e., including a rotor positioned radially inward of a stator), or alternatively may be an outrunner electric motor (i.e., including a stator positioned radially inward of a rotor), or alternatively, still, may be an axial flux electric motor (i.e., with the rotor neither outside the stator nor inside the stator, but rather offset from it along the axis of the electric motor).

As briefly noted above, the electrical power source (e.g., the electric machine 56 or the electric energy storage unit 55) is electrically connected with the electric propulsor assembly 200 (i.e., the electric motor 206) for providing electrical power to the electric propulsor assembly 200. More particularly, the electric motor 206 is in electrical communication with the electric machine 56 and/or the electric energy storage unit 55 through the electrical power bus 58, and more particularly through the one or more electrical cables or lines 60 extending therebetween.

It should be appreciated, however, that in other exemplary embodiments the exemplary hybrid-electric propulsion system 50 may have any other suitable configuration, and further, may be integrated into an aircraft 10 in any other suitable manner. For example, in other exemplary embodiments, the electric propulsor assembly 200 of the hybrid electric propulsion system 50 may instead be configured as a plurality of electric propulsor assemblies 200 and/or the hybrid electric propulsion system 50 may further include a plurality of gas turbine engines (such as turbofan engine 100) and electric machines 56.

Further, in other exemplary embodiments, the electric propulsor assembly(ies) 200 and/or gas turbine engine(s) and electric machine(s) 56 may be mounted to the aircraft 10 at any other suitable location in any other suitable manner (including, e.g., tail mounted configurations). For example, in certain exemplary embodiments, the electric propulsor assembly may be configured to ingest boundary layer air and reenergize such boundary layer air to provide a propulsive benefit for the aircraft (the propulsive benefit may be thrust, or may simply be an increase in overall net thrust for the aircraft by reducing a drag on the aircraft).

Moreover, in still other exemplary embodiments, the exemplary hybrid electric propulsion system 50 may have still other configurations. For example, in other exemplary embodiments, the hybrid electric propulsion system 50 may not include a "pure" electric propulsor assembly. For example, referring now briefly to FIG. 4, a schematic diagram of a hybrid-electric propulsion system 50 in accordance with yet another exemplary embodiment of the present disclosure is provided. The exemplary hybrid electric propulsion system 50 depicted in FIG. 4 may be configured in a similar manner as one or more the exemplary hybrid electric propulsion systems 50 described above with reference to FIGS. 1 through 3.

Figure 4:
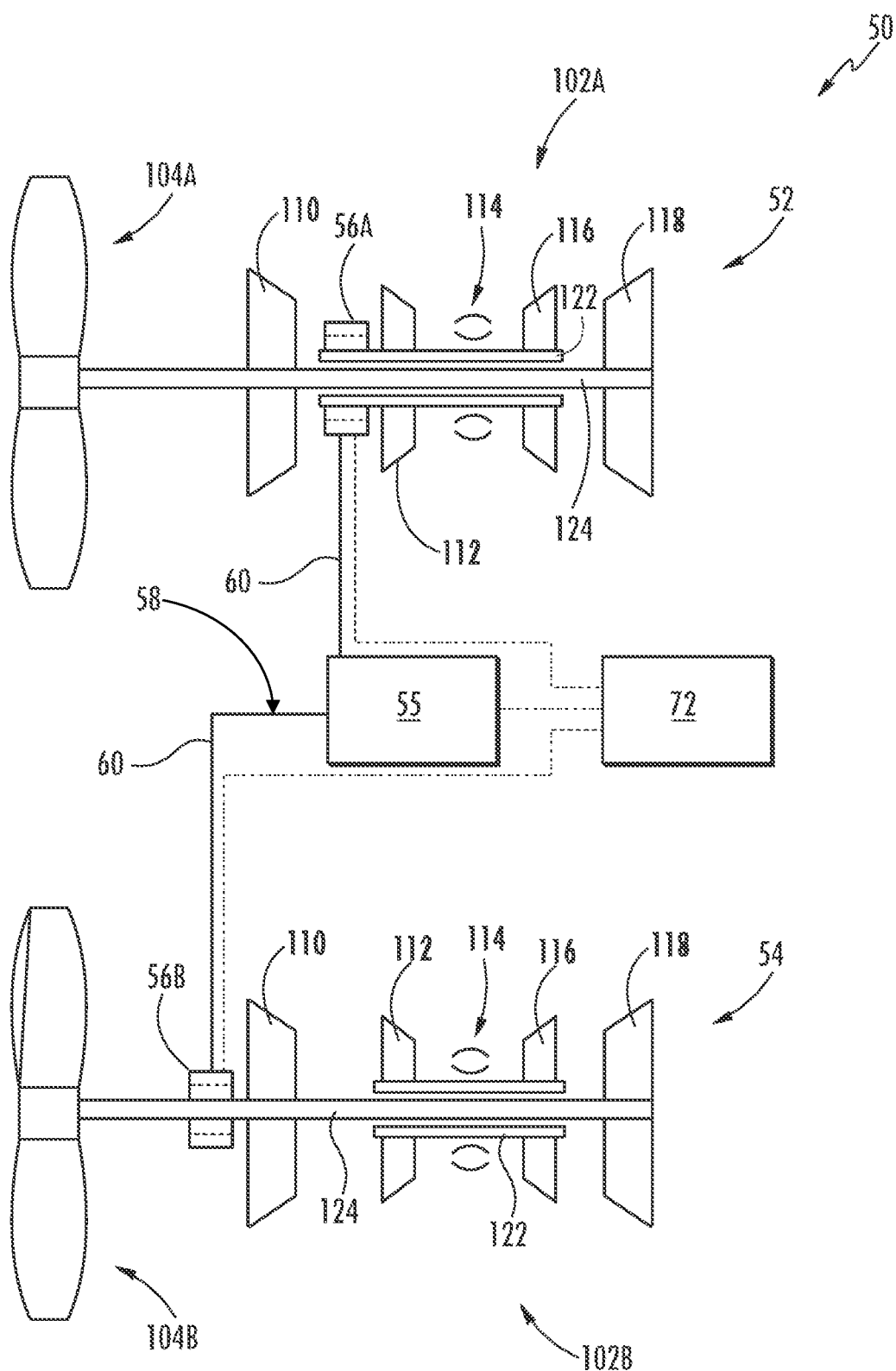
FIG. 4 is a schematic view of a propulsion system in accordance with another exemplary embodiment of the present disclosure.

For example, the exemplary hybrid-electric propulsion system 50 of FIG. 4 generally includes a first propulsor assembly 52 and a second propulsor assembly 54. The first propulsor assembly generally includes a first turbomachine 102A and a first propulsor 104A, and similarly, the second propulsor assembly 54 generally includes a second turbomachine 102B and a second propulsor 104B. Each of the first and second turbomachines 102A, 102B generally includes a low pressure system having a low pressure compressor 110 drivingly coupled to a low pressure turbine 118 through a low pressure shaft 124, as well as a high pressure system having a high pressure compressor 112 drivingly coupled to a high pressure turbine 116 through a high pressure shaft 122. Additionally, the first propulsor 104A is drivingly coupled to the low pressure system of the first turbomachine 102A and the second propulsor 104B is drivingly coupled to the low pressure system of the second turbomachine 102B. In certain exemplary embodiments, the first propulsor 104A and first turbomachine 102A may be configured as a first turbofan engine and similarly, the second propulsor 104B and second turbomachine 102B may be configured as a second turbofan engine (e.g., similar to the exemplary turbofan engine 100 of FIG. 2). Alternatively, however, these components may instead be configured as parts of a turboprop engine or any other suitable turbomachine-driven propulsion device. Further, in certain exemplary embodiments, the first propulsor assembly 52 may be mounted to a first wing of an aircraft and the second propulsor assembly 54 may be mounted to a second wing of the aircraft (similar, e.g., to the exemplary embodiment of FIG. 1). Of course, in other exemplary embodiments, any other suitable configuration may be provided (e.g., both may be mounted to the same wing, one or both may be mounted to a tail of the aircraft, etc.).

Moreover, the hybrid electric propulsion system 50 of FIG. 4 additionally includes an electrical system. The electrical system includes a first electric machine 56A, a second electric machine 56B, and an electric energy storage unit 55 electrically connectable to the first electric machine 56A and second electric machine 56B. The first electric machine 56A is additionally coupled to the first turbomachine 102A. More specifically, for the embodiment depicted, the first electric machine 56A is coupled to the high pressure system of the first turbomachine 102A, and more specifically still, is coupled to the high-pressure spool 122 of the first turbomachine 102A. In such a manner, the first electric machine 56A may extract power from the high pressure system of the first turbomachine 102A and/or provide power to the high-pressure system of the first turbomachine 102A.

Further, it will be appreciated that for the embodiment depicted, the second propulsor assembly 54 is not configured as a pure electric propulsor assembly. Instead, the second propulsor assembly 54 is configured as part of a hybrid electric propulsor. More particularly, the second electric machine 56B is coupled to the second propulsor 104B, and is further coupled to the low pressure system of the second turbomachine 102B. In such a manner, the second electric machine 56B may extract power from the low pressure system of the second turbomachine 102B and/or provide power to the low pressure system of the first turbomachine 102A. More particularly, in certain exemplary aspects, the second electric machine 56 may drive, or assist with driving the second propulsor 104B.

As is also depicted in FIG. 4, the exemplary hybrid electric propulsion system 50 further includes a controller 72 and a power bus 58. The first electric machine 56A, the second electric machine 56B, and the electric energy storage unit 55 are each electrically connectable to one another through one or more electric lines 60 of the power bus 58. For example, the power bus 58 may include various switches or other power electronics movable to selectively electrically connect the various components of the hybrid electric propulsion system 50, and optionally to convert or condition such electrical power transferred therethrough.

Furthermore, it should be appreciated that in still other exemplary embodiments, the exemplary hybrid electric propulsion system 50 may have other suitable configurations. For example, although the exemplary embodiment of FIG. 4 includes a first electric machine 56A coupled to the high-pressure system of the first turbomachine 102A and the second electric machine 56B coupled to the low pressure system of the second turbomachine 102B, in other exemplary embodiments, each of the electric machines 56A, 56B may be coupled to the low pressure system, or alternatively may be coupled to the high-pressure system. Alternatively, in other exemplary embodiments the electrical system may further include an additional electric machine coupled to the low pressure system of the first turbomachine 102A and/or an additional electric machine coupled to the high-pressure system of the second turbomachine 102B.

As previously discussed, the present disclosure generally provides for a method for operating a hybrid electric propulsion system during an un-commanded loss of thrust. More specifically, referring to FIG. 5, a flow diagram is provided of a method 300 for operating a turbomachine of a hybrid electric propulsion system of an aircraft in accordance with an exemplary aspect of the present disclosure. The exemplary method 300 of FIG. 5 may be utilized with one or more the exemplary hybrid electric propulsion systems described above with reference to FIGS. 1 through 4.

For example, the hybrid electric propulsion system may include a first propulsor, a first turbomachine, and an electrical system, the electrical system including a first electric machine coupled to the first turbomachine and an electric energy storage unit electrically connectable to the first electric machine. In certain exemplary aspects, the first turbomachine may be configured with the first propulsor as a turbofan engine, or alternatively, as any other suitable gas turbine engine. Additionally, in certain exemplary aspects the hybrid electric propulsion system may further include a second propulsor and the electrical system may further include a second electric machine coupled to the second propulsor. The second electric machine and second propulsor may be configured as an electric propulsor assembly (such as an electric fan), or alternatively, the hybrid electric propulsion system may further include a second turbomachine configured with the second propulsor as a second turbofan engine, or alternatively, as any other suitable gas turbine engine.

Figure 5:
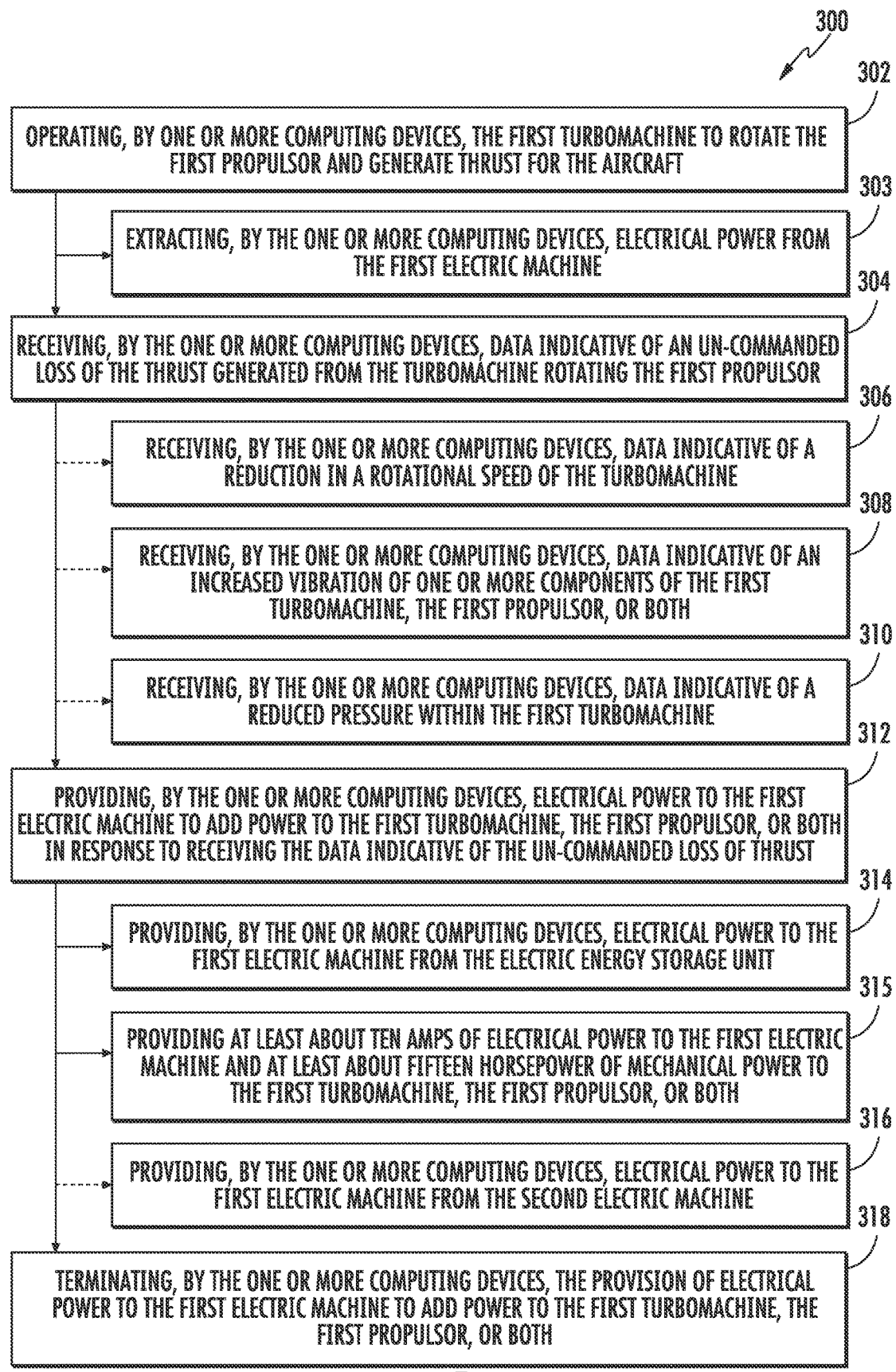
FIG. 5 is a flow diagram of a method for operating a gas turbine engine of a hybrid electric propulsion system of an aircraft in accordance with an exemplary aspect of the present disclosure.

Referring now to FIG. 5, the method 300 generally includes at (302) operating, by one or more computing devices, the first turbomachine to rotate the first propulsor and generate thrust for the aircraft. In certain exemplary aspects, operating, by the one or more computing devices, the first turbomachine to rotate the first propulsor and generate thrust for the aircraft at (302) may include operating the first turbomachine in a steady-state operating condition, such as in a cruise operating condition. Additionally, for the exemplary aspect depicted, operating, by the one or more computing devices, the first turbomachine to rotate the first propulsor and generate thrust for the aircraft at (302) also includes at (303) extracting, by the one or more computing devices, electrical power from the first electric machine. For example, extracting electrical power at (303) may include extracting at least about ten (10) amps of electrical power. The electrical power extracted from the first electric machine during operation of the first turbomachine at (302) may be extracted to electric energy storage unit, and/or, if included, the second electric machine.

Moreover, the exemplary method 300 depicted includes at (304) receiving, by the one or more computing devices, data indicative of an un-commanded loss of the thrust generated from the first turbomachine rotating the first propulsor at (302). The data received at (304) may be any data indicative of an amount of thrust generated from the first turbomachine rotating the first propulsor being reduced in a manner not commanded by, e.g., a flight crew of the aircraft, or one or more controllers of the aircraft.

For example, for the exemplary aspect of the method 300 depicted in FIG. 5, receiving, by the one or more computing devices, data indicative of the un-commanded loss of thrust at (304) may include, as is depicted in phantom, at (306) receiving, by the one or more computing devices, data indicative of a reduction in a rotational speed of the turbomachine. For example, in certain exemplary aspects, receiving, by the one or more computing devices, data indicative of the reduction in the rotational speed of the turbomachine at (306) may include receiving data indicative of a reduction in a rotational speed of a low pressure system of the turbomachine, a reduction in a rotational speed of a high-pressure system of the turbomachine, a deceleration of the low pressure system of the turbomachine, a deceleration of the high-pressure system of the turbomachine, an increase in a speed parameter mismatch between two spools of the turbomachine, etc. The data received at (306) may be from one or more sensors within the first turbomachine.

Additionally, or alternatively, as is also depicted in phantom, in other exemplary aspects of the present disclosure, the receiving, by the one or more computing devices, data indicative of the un-commanded loss of the thrust at (304) may include at (308) receiving, by the one or more computing devices, data indicative of an increased vibration of one or more components of the first turbomachine, the first propulsor, or both. For example, receiving, by the one or more computing devices, data indicative of the increased vibration of one or more components of the first turbomachine, the first propulsor, or both at (308) may include receiving data indicative of a vibration of the propulsor being above a predetermined threshold, a vibration of a low pressure compressor of the first turbomachine being above a predetermined threshold, a vibration of one or more support members within the first turbomachine being above a predetermined threshold, etc. It will be appreciated that while vibration, in and of itself, may not be used to measure thrust directly, an increase in the amount of vibration may be indicative of a loss of thrust (e.g., indicative of engine health).

It will be appreciated, that receiving, by the one or more computing devices, data indicative of the reduction in the rotational speed of the turbomachine at (306) and/or receiving, by the one or more computing devices, data indicative of the increased vibration of one or more components of the first turbomachine, the first propulsor, or both at (308) may indicate that an ingestion event has occurred. For example, having one or more of these symptoms may indicate that the first turbomachine has ingested one or more birds (commonly referred to as a "bird strike"), ice (which may be common during icing conditions), etc.

Moreover, referring still to the exemplary aspect of the method 300 depicted in FIG. 5, in still other exemplary aspects, as is again depicted in phantom, receiving, by the one or more computing devices, data indicative of the un-commanded loss of the thrust at (304) may additionally or alternatively include at (310) receiving, by the one or more computing devices, data indicative of a reduced pressure within the first turbomachine. In certain exemplary aspects, the data indicative of the reduced pressure within the turbomachine received at (310) may be data indicative of a reduced pressure within a low pressure compressor, a reduced pressure within a high pressure compressor, a reduced pressure within a combustion section of the first turbomachine (such as a reduced pressure within a combustion chamber of the combustion section of the first turbomachine), a reduced pressure at an outlet nozzle of the first turbomachine, etc. The data indicative of the reduced pressure within the turbomachine received at (310) may indicate a loss of the thrust generated from the turbomachine rotating the first propulsor by indicating a reduction in an airflow through the turbomachine. Additionally, or alternatively, wherein the data indicative of the reduced pressure within the turbomachine received at (310) is data indicative of the reduced pressure within the combustion section of the first turbomachine, the data indicative of a reduced pressure within the turbomachine received at (310) may be indicative of a combustor blowout.

Referring still to FIG. 5, the method 300 may supplement power to the first turbomachine in response to receiving the data indicative of the un-commanded loss of thrust at (304). More specifically, the method 300 further includes at (312) providing, by the one or more computing devices, electrical power to the first electric machine to add power to the first turbomachine, the first propulsor, or both in response to receiving the data indicative of the un-commanded loss of thrust at (304) (i.e., providing electrical power to the first electric machine to drive one or more components of the first turbomachine, the first propulsor, or both in response to receiving the data indicative of the un-commanded loss of thrust at (304)). More specifically, for the exemplary aspect depicted, providing, by the one or more computing devices, electrical power to the first electric machine at (312) further includes at (314) providing, by the one or more computing devices, electrical power to the first electric machine from the electric energy storage unit. Additionally, for the exemplary aspect of the method 300 depicted, providing, by the one or more computing devices, electrical power to the first electric machine at (312) includes at (315) providing at least about ten amps of electrical power to the first electric machine and at least about fifteen horsepower of mechanical power to the first turbomachine, the first propulsor, or both.

It should be appreciated, however, that in other exemplary aspects, electrical power may be provided to the first electric machine from any other suitable power source. For example, in certain exemplary aspects, the second electric machine of the electrical system of the hybrid electric propulsion system may be included, and may be coupled to a second turbomachine. With such an exemplary aspect, the second electric machine may extract electrical power from the rotation of the second turbomachine. Accordingly, as is depicted in phantom, with such an exemplary aspect providing, by the one or more computing devices, electrical power to the first electric machine at (312) may further include at (316) providing, by the one or more computing devices, electrical power to the first electric machine from the second electric machine.

In either of the above exemplary aspects, providing, by the one or more computing devices, electrical power to the first electric machine at (312) to add power to the first turbomachine, the first propulsor, or both in response to receiving the data indicative of the un-commanded loss of the thrust at (304) may allow for the hybrid electric propulsion system to substantially instantaneously supplement a reduced power output to the first turbomachine, at least partially restoring operation of the first turbomachine and first propulsor to generate the thrust. Such as possible despite the event(s) leading to the un-commanded loss of the thrust. For example, within a relatively short period of time after, e.g., an ingestion event or combustor blowout, by providing electrical power to the first electric machine such that the first electric machine may add power to the first turbomachine, the first propulsor, or both, the first propulsor may be back up and rotating and generating thrust for the aircraft. Notably, in certain exemplary aspects, the first electric machine may be coupled to a low pressure system of the first turbomachine, such that rotation of the first electric machine directly rotates the first propulsor (see, e.g., FIG. 2), or alternatively, the first electric machine may be coupled to a high pressure system of the first turbomachine, such that rotation of the first electric machine increases an airflow through the first turbomachine such as the first turbomachine may continue to drive the first propulsor (see FIG. 4).

Furthermore, referring still to the exemplary aspect of the method 300 depicted in FIG. 5, the method 300 also includes at (318) terminating, by the one or more computing devices, the provision of electrical power to the first electric machine to add power to the first turbomachine, the first propulsor, or both at (312). More specifically, referring now also to FIG. 6, providing a more detailed flow diagram of an exemplary aspect of the method 300 of FIG. 5, for the exemplary aspect depicted, the method 300 further includes receiving, by the one or more computing devices, data indicative of a restoration of engine operability, or more particularly includes at (320) receiving, by the one or more computing devices, data indicative of a restoration of the thrust generated from the first turbomachine rotating the first propulsor. The data indicative of the restoration of the thrust received at (320) may be data indicative of an operability parameter of the first turbomachine being within a desired range. For example, in certain exemplary aspects, the data received at (320) may be data indicative of a rotational speed of one or more components of the turbomachine being above a determined threshold. For example, the rotational speed may be a speed of a spool of the first turbomachine to which the first electric machine is not coupled. Additionally, or alternatively, the data indicative of the restoration of the thrust received at (320) may be data indicative of a pressure within the turbomachine being above a determined threshold, or data indicative of a temperature within the turbomachine (such as, e.g., an exhaust gas temperature) being above a determined threshold. Notably, however, in other exemplary aspects, the data may not necessarily indicate restoration of thrust, and instead may simply indicate the engine is operating (e.g., that the engine has returned to idle after rolling back from idle inadvertently).

Figure 6:
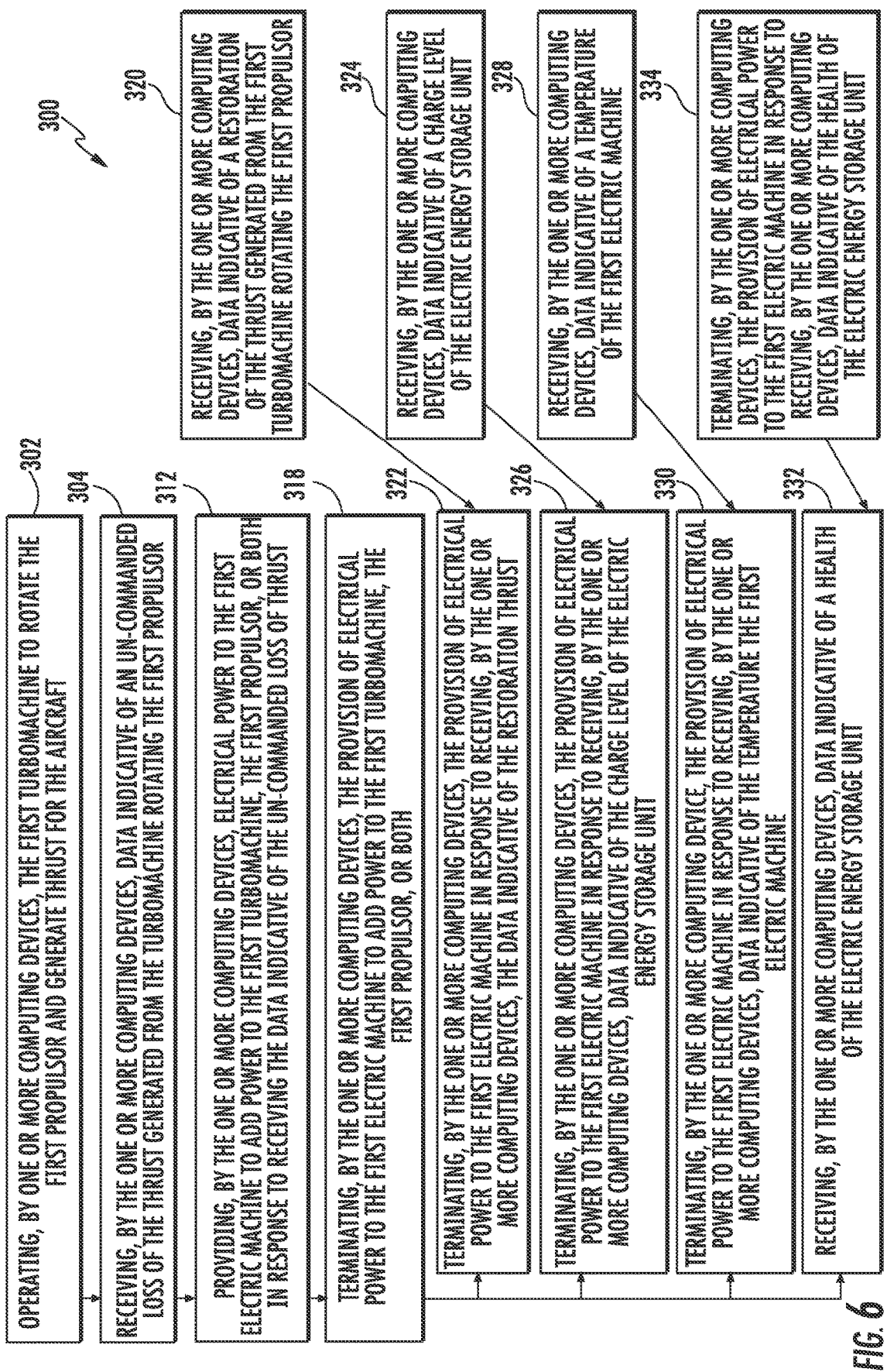
FIG. 6 is a flow diagram of a method for operating a gas turbine engine of a hybrid electric propulsion system of an aircraft in accordance with another exemplary aspect of the present disclosure

Referring still to the FIG. 6, in such an exemplary aspect, terminating, by the one or more computing devices, the provision of electrical power to the first electric machine at (318) further includes at (322) terminating, by the one or more computing device, the provision of electrical power to the first electric machine in response to receiving, by the one or more computing devices, the data indicative of the restoration thrust at (320).

Moreover, in still other exemplary aspects method may terminate provision electrical power to the first electric machine in response to receiving information indicative of various other indicators. For example as is depicted, the exemplary method 300 of FIG. 6 further includes at (324) receiving, by the one or more computing devices, data indicative of a charge level of the electric energy storage unit. For example, the data received at (324) indicative of the charge level of the energy storage unit may be data indicative of the charge level of the energy storage unit being at, below, or approaching a minimum charge threshold. Accordingly, with such an exemplary aspect, terminating, by the one or more computing devices, the provision of electrical power to the first electric machine at (318) may include at (326) terminating, by the one or more computing devices, the provision of electrical power to the first electric machine in response to receiving, by the one or more computing devices, data indicative of the charge level of the electric energy storage unit at (324).

Additionally, or alternatively, still, the method 300 may terminate the provision of electrical power based on still other indicators. For example, as is also depicted, the method 300 of FIG. 6 further includes at (328) receiving, by the one or more computing devices, data indicative of a temperature of the first electric machine. For example, the data indicative of the temperature of the first electric machine received at (328) may be data indicative of the temperature the first electric machine being at, or approaching, an upper temperature threshold for the first electric machine. The first electric machine may be at a greater risk of damage when operated above the upper temperature threshold. Accordingly, with such an exemplary aspect, terminating, by the one or more computing devices, the provision of electrical power to the first electric machine at (318) may include at (330) terminating, by the one or more computing devices, the provision of electrical power to the first electric machine in response to receiving, by the one or more computing devices, data indicative of the temperature the first electric machine at (328).

Further, in still other exemplary aspects method may terminate provision electrical power based on still other indicators. For example as is depicted, the exemplary method 300 of FIG. 6 further includes at (332) receiving, by the one or more computing devices, data indicative of a health of the electric energy storage unit. For example, the data received at (332) indicative of the health of the energy storage unit may be data indicative of a temperature of the electric energy storage unit being above, or below, a desired operating temperature threshold. Accordingly, with such an exemplary aspect, terminating, by the one or more computing devices, the provision of electrical power to the first electric machine at (318) may include at (334) terminating, by the one or more computing devices, the provision of electrical power to the first electric machine in response to receiving, by the one or more computing devices, data indicative of the health of the electric energy storage unit at (324).

Operating hybrid electric propulsion system in accordance with one or more of the above exemplary aspects may allow for a more seamless operation of the hybrid electric propulsion system.

Figure 7:
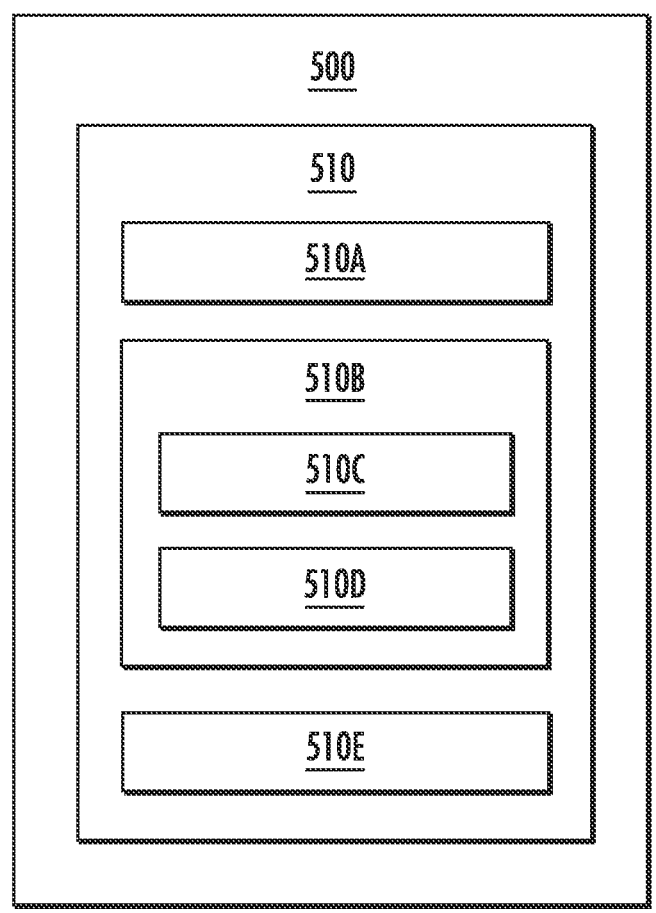
FIG. 7 is a computing system according to example aspects of the present disclosure.

Referring now to FIG. 7, an example computing system 500 according to example embodiments of the present disclosure is depicted. The computing system 500 can be used, for example, as a controller 72 in a hybrid electric propulsion system 50. The computing system 500 can include one or more computing device(s) 510. The computing device(s) 510 can include one or more processor(s) 510A and one or more memory device(s) 510B. The one or more processor(s) 510A can include any suitable processing device, such as a microprocessor, microcontroller, integrated circuit, logic device, and/or other suitable processing device. The one or more memory device(s) 510B can include one or more computer-readable media, including, but not limited to, non-transitory computer-readable media, RAM, ROM, hard drives, flash drives, and/or other memory devices.

The one or more memory device(s) 510B can store information accessible by the one or more processor(s) 510A, including computer-readable instructions 510C that can be executed by the one or more processor(s) 510A. The instructions 510C can be any set of instructions that when executed by the one or more processor(s) 510A, cause the one or more processor(s) 510A to perform operations. In some embodiments, the instructions 510C can be executed by the one or more processor(s) 510A to cause the one or more processor(s) 510A to perform operations, such as any of the operations and functions for which the computing system 500 and/or the computing device(s) 510 are configured, the operations for operating a turbomachine (e.g., method 300), as described herein, and/or any other operations or functions of the one or more computing device(s) 510. Accordingly, the method 300 may be computer-implemented methods. The instructions 510C can be software written in any suitable programming language or can be implemented in hardware. Additionally, and/or alternatively, the instructions 510C can be executed in logically and/or virtually separate threads on processor(s) 510A. The memory device(s) 510B can further store data 510D that can be accessed by the processor(s) 510A. For example, the data 510D can include data indicative of power flows, data indicative of power demands of various loads in a hybrid electric propulsion system, data indicative of operational parameters of the hybrid electric propulsion system, including of a turbomachine of the hybrid electric propulsion system.

The computing device(s) 510 can also include a network interface 510E used to communicate, for example, with the other components of system 500 (e.g., via a network). The network interface 510E can include any suitable components for interfacing with one or more network(s), including for example, transmitters, receivers, ports, controllers, antennas, and/or other suitable components. One or more external display devices (not depicted) can be configured to receive one or more commands from the computing device(s) 510.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a turbomachine of a hybrid-electric propulsion system of an aircraft, the hybrid-electric propulsion system comprising a propulsor, a turbomachine, and an electrical system having an electric machine coupled to the turbomachine, the method comprising:
operating, by one or more computing devices, the turbomachine to rotate the propulsor and generate thrust for the aircraft;
receiving, by the one or more computing devices, data indicative of an un-commanded loss of the thrust generated from the turbomachine rotating the propulsor, wherein the data indicative of an un-commanded loss of thrust includes data indicating that the loss of thrust is a partial or temporary loss of thrust, wherein receiving, by the one or more computing devices, data indicative of the un-commanded loss of the thrust comprises receiving data indicative of an un-commanded increased vibration of one or more components of the turbomachine, of the propulsor, or both; and
providing, by the one or more computing devices, electrical power to the electric machine to add mechanical power to the turbomachine, the propulsor, or both in response to receiving the data indicative of the un-commanded loss of thrust.

2. The method of claim 1, wherein receiving, by the one or more computing devices, data indicative of the un-commanded increased vibration of one or more components of the turbomachine, the propulsor, or both includes receiving data indicative of a vibration of the propulsor being above a predetermined threshold, a vibration of a low pressure compressor of the turbomachine being above a predetermined threshold, a vibration of one or more support members within the turbomachine being above a predetermined threshold, or a combination thereof.

3. The method of claim 1, wherein providing, by the one or more computing devices, electrical power to the electric machine to add mechanical power to the turbomachine, the propulsor, or both in response to receiving the data indicative of the un-commanded loss of thrust comprises providing, by the one or more computing devices, electrical power to the electric machine to add mechanical power to the turbomachine, the propulsor, or both in response to receiving the data indicative of the un-commanded loss of thrust to make up for the un-commanded loss of thrust.

4. The method of claim 1, wherein the electrical system further comprises an electric energy storage unit, and wherein providing, by the one or more computing devices, electrical power to the electric machine comprises providing, by the one or more computing devices, electrical power to the electric machine from the electric energy storage unit.

5. The method of claim 1, wherein the turbomachine is a first turbomachine, wherein the electric machine is a first electric machine, wherein the hybrid-electric propulsion system further comprises a second turbomachine, wherein the electrical system further comprises a second electric machine coupled to the second turbomachine, and wherein providing, by the one or more computing devices, electrical power to the electric machine comprises providing, by the one or more computing devices, generated electrical power to the first electric machine from the second electric machine.

6. The method of claim 1, wherein receiving, by the one or more computing devices, data indicative of the un-commanded loss of the thrust comprises receiving, by one or more computing devices, data indicative of an un-commanded reduced pressure within the turbomachine.

7. The method of claim 1, further comprising:
terminating, by the one or more computing devices, the provision of electrical power to the electric machine to add mechanical power to the turbomachine, the propulsor, or both.

8. The method of claim 7, further comprising:
receiving, by the one or more computing devices, data indicative of a restoration of engine operability equal to that prior to the un-commanded loss of thrust, and wherein terminating, by the one or more computing devices, the provision of electrical power to the electric machine comprises terminating, by the one or more computing devices, the provision of electrical power to the electric machine in response to receiving, by the one or more computing devices, data indicative of the restoration of engine operability.

9. The method of claim 8, wherein receiving, by the one or more computing devices, data indicative of the restoration of engine operability equal to that prior to the un-commanded loss of thrust comprises receiving, by the one or more computing devices, data indicative of a restoration of the thrust generated from the turbomachine rotating the propulsor, and wherein the data indicative of the restoration of the thrust comprises data indicative of an operability parameter of the turbomachine being within a certain operability range.

10. The method of claim 6, wherein receiving, by the one or more computing devices, data indicative of the restoration of engine operability comprises receiving, by the one or more computing devices, data indicative of a restoration of the thrust generated from the turbomachine rotating the propulsor, and wherein the data indicative of the restoration of the thrust comprises data indicative of at least one of a rotational speed of the turbomachine being above a determined threshold or a pressure within the turbomachine being above a determined threshold.

11. The method of claim 1, wherein providing, by the one or more computing devices, electrical power to the electric machine comprises transferring, by one or more computing devices, at least ten amps of electrical power to the electric machine.

12. The method of claim 1, wherein providing, by the one or more computing devices, electrical power to the electric machine comprises providing, by the one or more computing devices, electrical power to the electric machine such that the electric machine provides at least fifteen horsepower of mechanical power to the turbomachine.

13. The method of claim 1, wherein operating, by the one or more computing devices, the turbomachine to rotate the propulsor and generate thrust for the aircraft comprises extracting, by the one or more computing devices, electrical power from the electric machine.

14. A hybrid-electric propulsion system for an aircraft comprising:
- a propulsor;
- a turbomachine coupled to the propulsor for driving the propulsor and generating thrust;
- an electrical system comprising an electric machine, the electric machine coupled to the turbomachine; and
- a controller configured to receive data indicative of an un-commanded loss of thrust generated from the turbomachine driving the propulsor, wherein the controller is further configured for receiving, by one or more computing devices, data indicative of an increased vibration of one or more components of the turbomachine, wherein the data indicative of an un-commanded loss of thrust includes data indicating that the loss of thrust is a partial or temporary loss of thrust, the controller further configured to provide electrical power to the electric machine to add mechanical power to the turbomachine, the propulsor, or both in response to receiving the data indicative of the un-commanded loss of the thrust.

15. The hybrid-electric propulsion system of claim 14, wherein the electrical system further comprises an electric energy storage unit, and wherein in providing electrical power to the electric machine, the controller is configured to provide electrical power to the electric machine from the electric energy storage unit.

16. The hybrid-electric propulsion system of claim 14, wherein the electric machine is configured to provide at least sixty-five horsepower of mechanical power to the turbomachine, the propulsor, or both when electrical power is provided thereto.

17. The hybrid-electric propulsion system of claim 14, wherein in receiving, by the one or more computing devices, data indicative of the un-commanded loss of the thrust, the controller is further configured for receiving, by the one or more computing devices, data indicative of a reduction in a rotational speed of the turbomachine.

18. A method for operating a turbomachine of a hybrid-electric propulsion system of an aircraft, the hybrid-electric propulsion system comprising a propulsor, a turbomachine, and an electrical system having an electric machine coupled to the turbomachine, the method comprising:
- operating, by one or more computing devices, the turbomachine to rotate the propulsor and generate thrust for the aircraft;
- receiving, by the one or more computing devices, data indicative of an un-commanded loss of the thrust generated from the turbomachine rotating the propulsor, wherein the data indicative of an un-commanded loss of thrust includes data indicating that the loss of thrust is a partial or temporary loss of thrust, wherein receiving, by the one or more computing devices, data indicative of the un-commanded loss of the thrust comprises receiving data indicative of an un-commanded reduction in a rotational speed of the turbomachine from a plurality of sensors within the turbomachine, the plurality of sensors configured to sense data indicative of a rotational speed of one or more components of the turbomachine; and
- providing, by the one or more computing devices, electrical power to the electric machine to add mechanical power to the turbomachine, the propulsor, or both in response to receiving the data indicative of the un-commanded loss of thrust.

19. The method of claim 18, wherein receiving, by the one or more computing devices, data indicative of the reduction in the rotational speed of the turbomachine includes receiving data indicative of an un-commanded reduction in a rotational speed of a low pressure system of the turbomachine, an un-commanded reduction in a rotational speed of a high-pressure system of the turbomachine, an un-commanded deceleration of the low pressure system of the turbomachine, an un-commanded deceleration of the high-pressure system of the turbomachine, an un-commanded increase in a speed parameter mismatch between two spools of the turbomachine, or a combination thereof.

* * * * *